(12) United States Patent
Kihara et al.

(10) Patent No.: US 7,847,459 B2
(45) Date of Patent: Dec. 7, 2010

(54) MAGNETO GENERATOR

(75) Inventors: Nobuhiro Kihara, Tokyo (JP); Kaoru Imaizumi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/769,793

(22) Filed: Jun. 28, 2007

(65) Prior Publication Data

US 2008/0191573 A1    Aug. 14, 2008

(30) Foreign Application Priority Data

Feb. 8, 2007    (JP) .............................. 2007-029233

(51) Int. Cl.
*H02K 21/12* (2006.01)
*H02K 21/26* (2006.01)
*H02K 21/38* (2006.01)
*H02K 23/04* (2006.01)

(52) U.S. Cl. ........................... 310/156.26; 310/156.01; 310/156.12; 310/156.22; 310/153

(58) Field of Classification Search ............ 310/156.26, 310/156.01, 156.12, 153, 156.22; H02K 1/27, H02K 21/22, 21/12, 21/26, 21/38, 23/04
See application file for complete search history.

(56) References Cited

U.S. PATENT DOCUMENTS

| | | | | |
|---|---|---|---|---|
| 3,258,623 A | * | 6/1966 | Phelon et al. | 310/156.31 |
| 3,727,302 A | * | 4/1973 | Phelon | 29/596 |
| 4,115,716 A | * | 9/1978 | Ogasawala et al. | 310/153 |
| 4,137,884 A | * | 2/1979 | Odazima et al. | 123/149 D |
| 4,219,752 A | * | 8/1980 | Katou | 310/156.19 |
| 4,701,654 A | * | 10/1987 | Tatukawa et al. | 310/153 |
| 4,795,924 A | * | 1/1989 | Kamiyama et al. | 310/67 R |
| 4,877,986 A | * | 10/1989 | Shimizu | 310/153 |
| 5,383,265 A | * | 1/1995 | Nishizawa | 29/598 |
| 5,659,216 A | * | 8/1997 | Bisantz | 310/156.26 |
| 6,339,271 B1 | * | 1/2002 | Noble et al. | 310/74 |
| 6,396,177 B1 | * | 5/2002 | Shin et al. | 310/63 |
| 6,429,564 B1 | | 8/2002 | Uemura et al. | |
| 6,614,140 B2 | * | 9/2003 | Uemura et al. | 310/156.12 |

(Continued)

FOREIGN PATENT DOCUMENTS

FR    2 663 797 A1    12/1991

(Continued)

OTHER PUBLICATIONS

Japanese Office Action dated Apr. 21, 2010 corresponding to Japanese Patent Application No. 2007-029233.

*Primary Examiner*—Quyen Leung
*Assistant Examiner*—John K Kim
(74) *Attorney, Agent, or Firm*—Sughrue Mion, PLLC (57) ABSTRACT

A magneto generator can increase a suppression force to suppress permanent magnets from being moved to an opening side of a flywheel with easy construction and at low cost. In this magnet generator, the flywheel has a groove formed on its inner peripheral wall surface at an opening side thereof, and a magnet positioning member has a magnet coming-off preventing member formed at the opening side of the flywheel so as to cover end faces of the permanent magnets, with a protrusion being formed on the magnet coming-off preventing member so as to engage the groove in the flywheel. The protrusion is in engagement with the groove whereby the movement in an axial direction of the permanent magnets can be suppressed.

8 Claims, 5 Drawing Sheets

U.S. PATENT DOCUMENTS

| | | | |
|---|---|---|---|
| 6,781,263 B2 * | 8/2004 | Uemura | 310/74 |
| 7,268,450 B2 * | 9/2007 | Takeuchi | 310/52 |
| 7,402,930 B2 * | 7/2008 | Kihara | 310/156.12 |
| 2002/0047338 A1 | 4/2002 | Uemura et al. | |
| 2003/0197442 A1 * | 10/2003 | Baba | 310/156.26 |
| 2003/0209949 A1 * | 11/2003 | Uemura | 310/156.12 |
| 2005/0236916 A1 * | 10/2005 | Uemura et al. | 310/58 |
| 2006/0066172 A1 * | 3/2006 | Takeuchi | 310/254 |
| 2007/0096576 A1 * | 5/2007 | Hashiba | 310/156.38 |
| 2008/0036324 A1 * | 2/2008 | Kihara | 310/153 |
| 2008/0191573 A1 * | 8/2008 | Kihara et al. | 310/153 |

FOREIGN PATENT DOCUMENTS

| | | |
|---|---|---|
| JP | 62-119180 U | 7/1987 |
| JP | 63-146461 U | 9/1988 |
| JP | 09-047002 A | 2/1997 |
| JP | 10-145996 A | 5/1998 |
| JP | 11-041844 A | 2/1999 |
| JP | 2003-319586 A | 11/2003 |
| JP | 57-3378 U | 5/2010 |
| WO | 03/088451 A1 | 10/2003 |

* cited by examiner

MAGNETO GENERATOR

BACKGROUND OF THE INVENTION

1. Field of the Invention

The present invention relates to a magneto generator which generates electricity under the electromagnetic induction action of permanent magnets and magneto coils in accordance with the rotation of a flywheel.

2. Description of the Related Art

In the past, there has been known a magneto generator which includes a bowl-shaped flywheel that rotates about an axis of rotation, a plurality of permanent magnets fixedly secured to an inner peripheral wall surface of the flywheel, a magnet positioning member made of a resin that is arranged at an inner side of the flywheel to position and fixedly secure the permanent magnets to the flywheel integrally therewith, a stator core that is arranged at an inner side of the permanent magnets and has a plurality of teeth protruding to a radially outer side, and a magneto coil that is formed of a conductor wound around each of the teeth (see, for example, a first patent document: Japanese patent application laid-open No. 2003-319586 (page 5 and FIG. 8)).

In addition, there has also been known another magneto generator which includes a cylindrical cover protector that is arranged at an inner side of permanent magnets, and has a collar portion bent in a radially outer direction so as to protect the permanent magnets, and a flywheel that has engagement segments formed at its open end face to fixedly fasten the collar due to their plastic deformation (see, for example, a second patent document: Japanese patent application laid-open No. H10-145996 (page 4, FIG. 2)).

In the magneto generator of the above-mentioned first patent document, there has been the following problem. That is, the movement in the circumferential direction of the permanent magnets is restricted by set portions that are formed on a circumferential side surface of the flywheel so as to protrude between adjacent permanent magnets, respectively, but there is no function to positively restrict the movement in the axial direction of the permanent magnets, so there is fear that the permanent magnets might be moved to an opening side of the flywheel due to an increase in the weight of the permanent magnets or an increase in external load (engine vibration, etc.).

Also, in the above-mentioned second patent document, there is the following problem. That is, the collar portion is formed at an open end portion of the cover protector, and the engagement segments of the flywheel are engaged with the collar portion through plastic deformation. As a result, the processing cost thereof becomes high, and the movement in the axial direction of the permanent magnets can be restricted by the plastically deformed engagement segments, but there is fear that the permanent magnets might be moved to the opening side of the flywheel, similar to the above-mentioned first patent document.

SUMMARY OF THE INVENTION

Accordingly, the present invention is intended to obviate the problems as referred to above, and has for its object to obtain a magneto generator which is capable of increasing a suppression force to suppress permanent magnets from being moved to an opening side of a flywheel with easy construction and at low cost.

In one aspect of the present invention, there is provided a magneto generator which includes: a flywheel that rotates about an axis of rotation; a plurality of permanent magnets that are fixedly secured to an inner peripheral wall surface of the flywheel; a magnet positioning member made of a resin that is arranged at an inner side of the flywheel to position and fixedly secure the permanent magnets to the flywheel integrally therewith; a stator core that is arranged at an inner side of the permanent magnets and has a plurality of teeth protruding to a radially outer side; and magneto coils that are each formed of a conductor wound around the individual teeth. The flywheel has a protrusion or groove formed on its inner peripheral wall surface at an opening side thereof. The magnet positioning member has a magnet coming-off preventing member formed at an opening side of the flywheel so as to cover end faces of the permanent magnets, and the magnet coming-off preventing member has a groove or protrusion formed so as to be in engagement with the protrusion or groove of the flywheel.

In another aspect of the present invention, there is provided a magneto generator which includes a flywheel that rotates about an axis of rotation; a plurality of permanent magnets that are fixedly secured to an inner peripheral wall surface of the flywheel; a magnet positioning member made of a resin that is arranged at an inner side of the flywheel to position and fixedly secure the permanent magnets to the flywheel integrally therewith; a stator core that is arranged at an inner side of the permanent magnets and has a plurality of teeth protruding to a radially outer side; and magneto coils that are each formed of a conductor wound around the individual teeth. The flywheel has a collar portion formed at an opening portion thereof, and the magnet positioning member has a magnet coming-off preventing member formed at an opening side of the flywheel so as to be interposed between end faces of the permanent magnets and the collar portion.

In a further aspect of the present invention, there is provided a magneto generator which includes: a flywheel that rotates about an axis of rotation; a plurality of permanent magnets that are fixedly secured to an inner peripheral wall surface of the flywheel; a magnet positioning member made of a resin that is arranged at an inner side of the flywheel to position and fixedly secure the permanent magnets to the flywheel integrally therewith; a cylindrical cover protector that is arranged along an inner wall surface of the magnet positioning member so as to protect the permanent magnets; a stator core that is arranged at an inner side of the permanent magnets and has a plurality of teeth protruding to a radially outer side; and magneto coils that are each formed of a conductor wound around the individual teeth. The cover protector has a collar portion formed at its peripheral end at an opening side of the flywheel. The magnet positioning member has a magnet coming-off preventing member formed at the opening side of the flywheel so as to cover end faces of the permanent magnets, and the collar portion is embedded in the magnet coming-off preventing member.

According to a magneto generator of the present invention, it is possible to increase a suppression force to suppress permanent magnets from being moved to an opening side of a flywheel with easy construction and at low cost.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, preferred embodiments of the present invention will be described in detail while referring to the accompanying drawings. Throughout respective figures, the same or corresponding members or parts are identified by the same reference numerals and characters.

Embodiment 1

Figure 1:
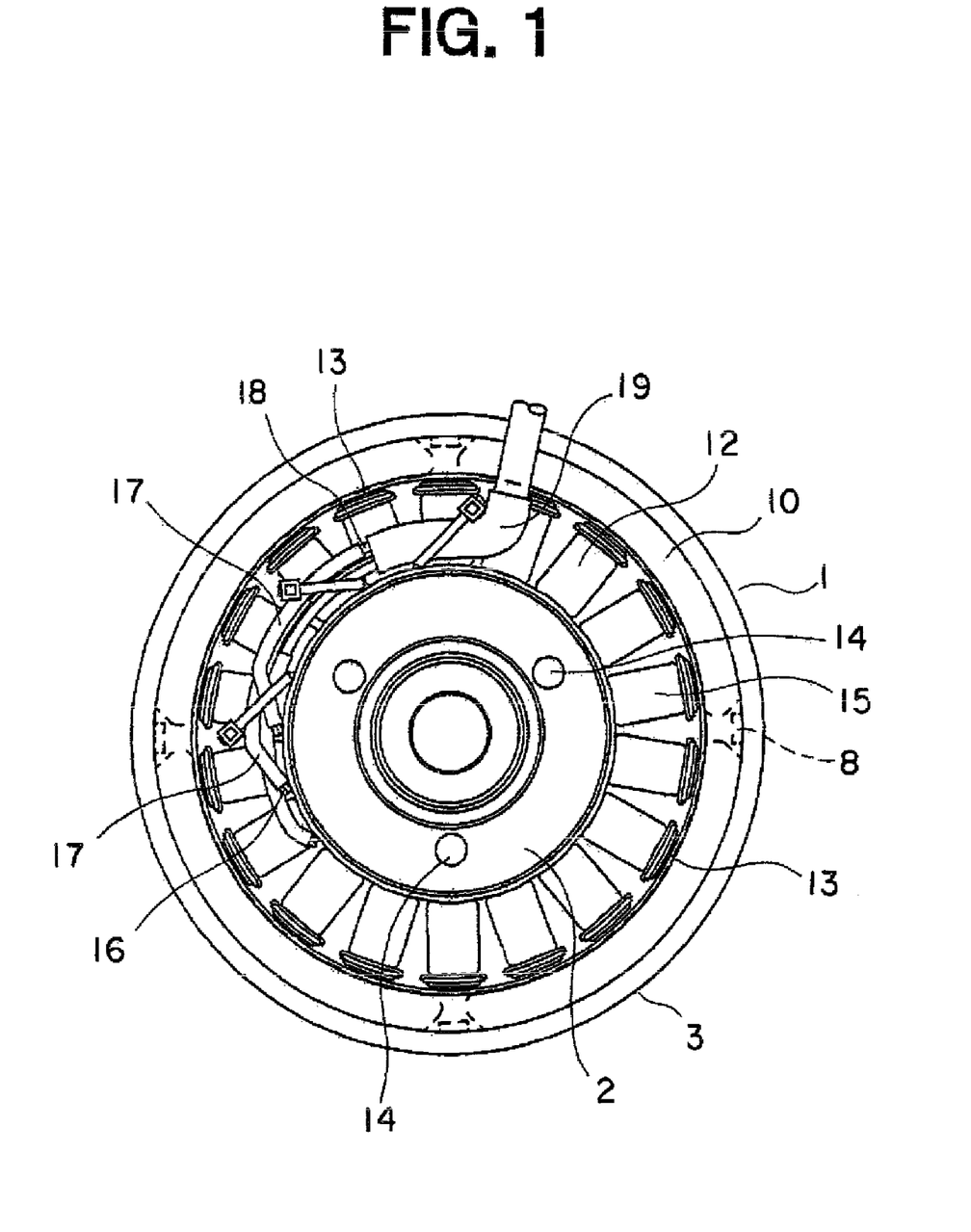
FIG. 1 is a front elevational view showing a magneto generator according to a first embodiment of the present invention.
Figure 2:
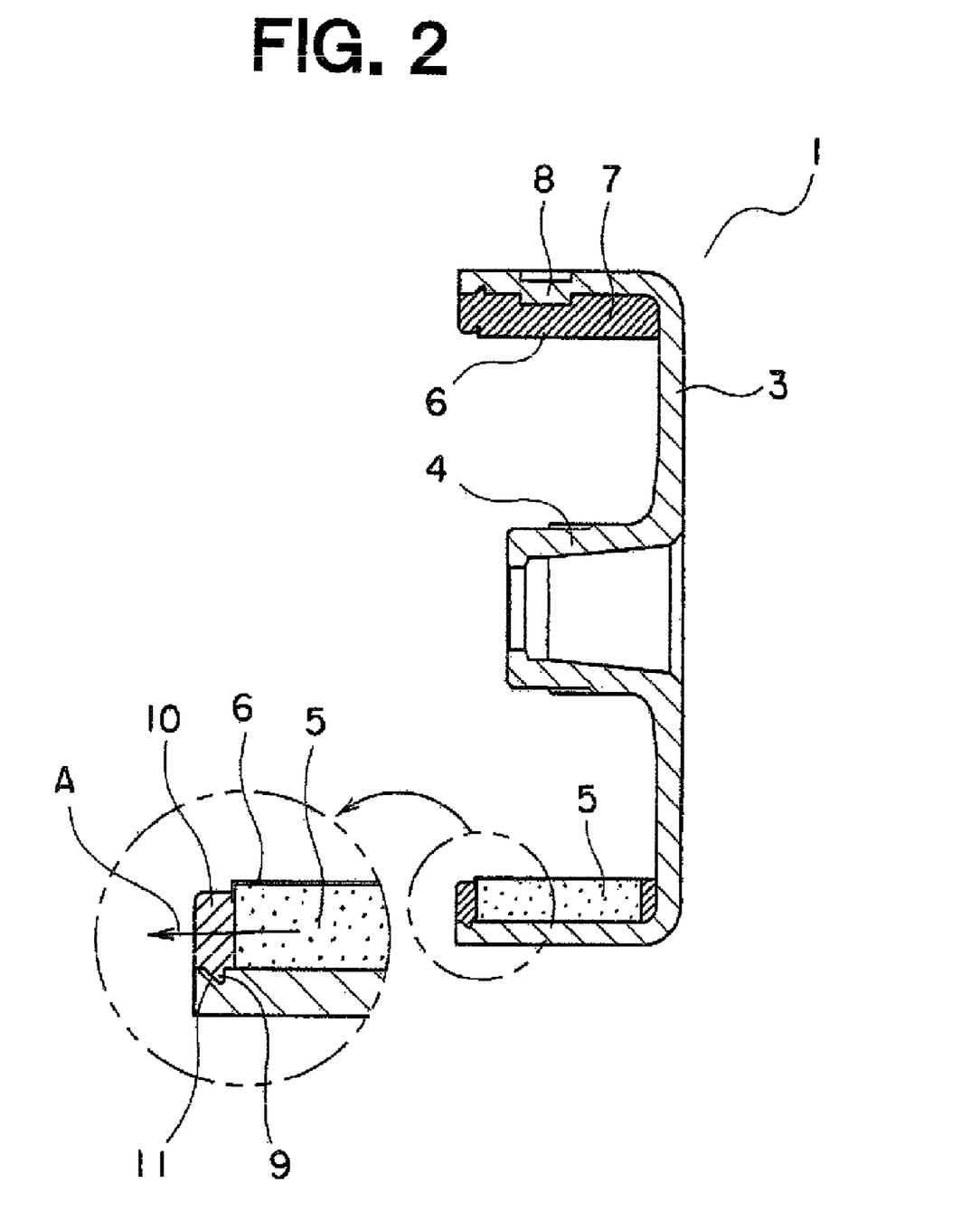
FIG. 2 is a cross sectional side view showing a rotor of the magneto generator of FIG. 1.

Referring to the drawings and first to FIG. 1, therein is shown, in a front elevational view, a magneto generator according to a first embodiment of the present invention. FIG. 2 is a cross sectional side elevational view that shows a rotor 1 of the magneto generator of FIG. 1.

This magneto generator is provided with the rotor 1 operatively connected with an internal combustion engine, and a stator 2 mounted on a bracket (not shown) arranged inside the rotor 1.

The rotor 1 includes a bowl-shaped flywheel 3 that has a boss portion 4 connected with a rotation shaft (not shown) which is driven to rotate by the internal combustion engine, permanent magnets 5 that are arranged on an inner peripheral wall surface of the flywheel 3 at intervals in a circumferential direction thereof, a magnet positioning member 7 that is made of resin and is arranged at an inner side of the permanent magnets 5 for positioning and fastening the permanent magnets 5 integrally with the flywheel 3, and a cylindrical cover protector 6 that is made of a non-magnetic metal such as SUS, etc., and is arranged in intimate contact with an inner side of each permanent magnet 5.

The individual permanent magnets 5, each being of a rectangular parallelepiped shape and composed of a rare-earth magnet, are arranged in such a manner that one type of permanent magnets 5, which have an N pole at a radially inner side and an S pole at a radially outer side, and another type of permanent magnets 5, which have an S pole at a radially inner side and an N pole at a radially outer side, are disposed in an alternate manner in a circumferential direction. In this manner, the plurality of permanent magnets 5 are polarized in such a manner that adjacent permanent magnets 5 have mutually opposite polarities, whereby in an inner space of the rotor 1, there is generated a magnetic field the direction of which is changing in an alternate manner.

The flywheel 3 is formed on a circumferential side surface thereof with a plurality of set portions 8 that protrude between adjacent ones of the permanent magnets 5. The movement in the circumferential direction of the permanent magnets 5 is restricted by the set portions 8.

The flywheel 3 has a groove 9 formed on its inner peripheral wall surface at an opening side thereof so as to extend over the entire perimeter thereof along a circumferential direction thereof.

The magnet positioning member 7 has a magnet coming-off preventing member 10 formed integrally therewith at the opening side of the flywheel 3 so as to cover the end faces of the permanent magnets 5. The magnet coming-off preventing member 10 has a wedge-shaped protrusion 11 formed so as to engage the groove 9.

Here, note that the groove 9 and the protrusion 11 may be intermittently or discontinuously formed in a circumferential direction.

The stator 2 has a hollow cylindrical stator core (not shown) and three-phase magneto coils 12. On the outer peripheral portion of the stator core, there are formed a plurality of teeth 13 that radially protrude in a radially outer direction at equal circumferential intervals.

The stator core having the plurality of teeth 13 formed on its outer peripheral portion is composed of a laminated iron core (not shown) which is formed of a multitude of thin hollow magnetic steel plates in the form of cold rolled steel plates laminated one over another in the direction of the axis of rotation, and a pair of end plates (not shown) superposed on opposite side surfaces of the laminated iron core, respectively, in intimate contact therewith.

Three through holes 14 are formed through the end plates and the laminated iron core in parallel to the axis of rotation. The laminated iron core and the end plates are integrated with one another by means of bolts (not shown) inserted through the through holes 14 and nuts (not shown) threaded on the ends of the bolts, respectively.

The magneto coils 12 are formed by winding conductors having their surfaces coated with enamel on the circumferential side surfaces of the teeth 13 of the stator core, and an insulating material 15 with an epoxy type powder coating is applied to the circumferential side surfaces of the teeth 13 around which the conductors are wound.

The magneto coils 12 have their lead wires 16 of the individual phases extended from the stator core and covered with first protective tubes 17. The individual phase lead wires 16 are electrically connected with leads 18, respectively, for leading to electrical equipment (not shown) in the first protective tubes 17. The leads 18 extending in a tangential direction of the stator 2 are covered with second protective tubes 19.

In the magneto generator as constructed above, the flywheel 3 is rotated in association with a rotation shaft of the rotor which is driven to rotate by the internal combustion engine, and at that time, electric power is generated in the magneto coils 12 by the alternating fields which are brought about by the permanent magnets 5. An AC output thus generated is rectified by an unillustrated rectifier diode, and fed to loads such as a battery, headlights, etc., mounted on a vehicle.

According to the magneto generator of the above-mentioned construction, the magnet positioning member 7 has the magnet coming-off preventing member 10 formed integrally therewith at the opening side of the flywheel 3 so as to cover the end faces of the permanent magnets 5, and the magnet coming-off preventing member 10 has the wedge-shaped protrusion 11 formed so as to engage the groove 9.

Accordingly, when a force in an axial direction (in a direction of arrow A in FIG. 2) acts on the permanent magnets 5 due to an external load such as engine vibration, the force is mainly supported by a shearing stress generated in the protrusion 11, so the proof strength of the permanent magnets 5 resistant to the axial movement thereof can be improved to a great extent with a simple construction and at a low cost.

Figure 3:
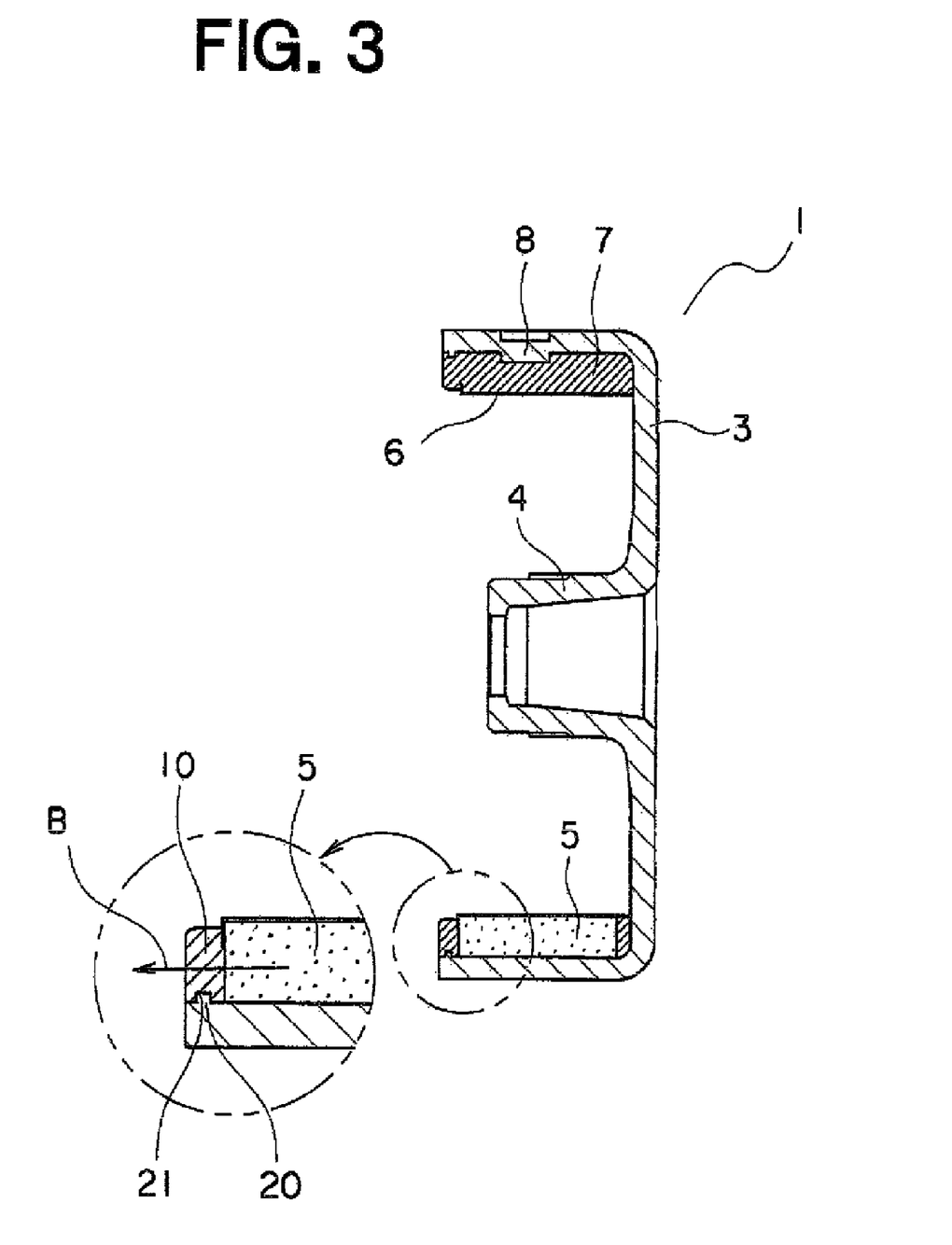
FIG. 3 is a cross sectional side view of a modified form of rotor of the magneto generator according to the first embodiment of the present invention.

Here, note that as shown in FIG. 3, the magnet coming-off preventing member 10 covering the end faces of the permanent magnets 5 may be formed with a groove 21 that extends over its entire perimeter along a circumferential direction thereof, and a protrusion 20 of a convex shape engaging the groove 21 may be formed on the inner wall surface of the opening portion of the flywheel 3.

In this case, too, when a force in an axial direction (in a direction of arrow B in FIG. 3) acts on the permanent magnets 5, the force is mainly supported by a shearing stress generated in the protrusion 20, so the proof strength of the permanent magnets 5 resistant to the axial movement thereof can be improved to a great extent with a simple construction and at a low cost.

Embodiment 2

Figure 4:
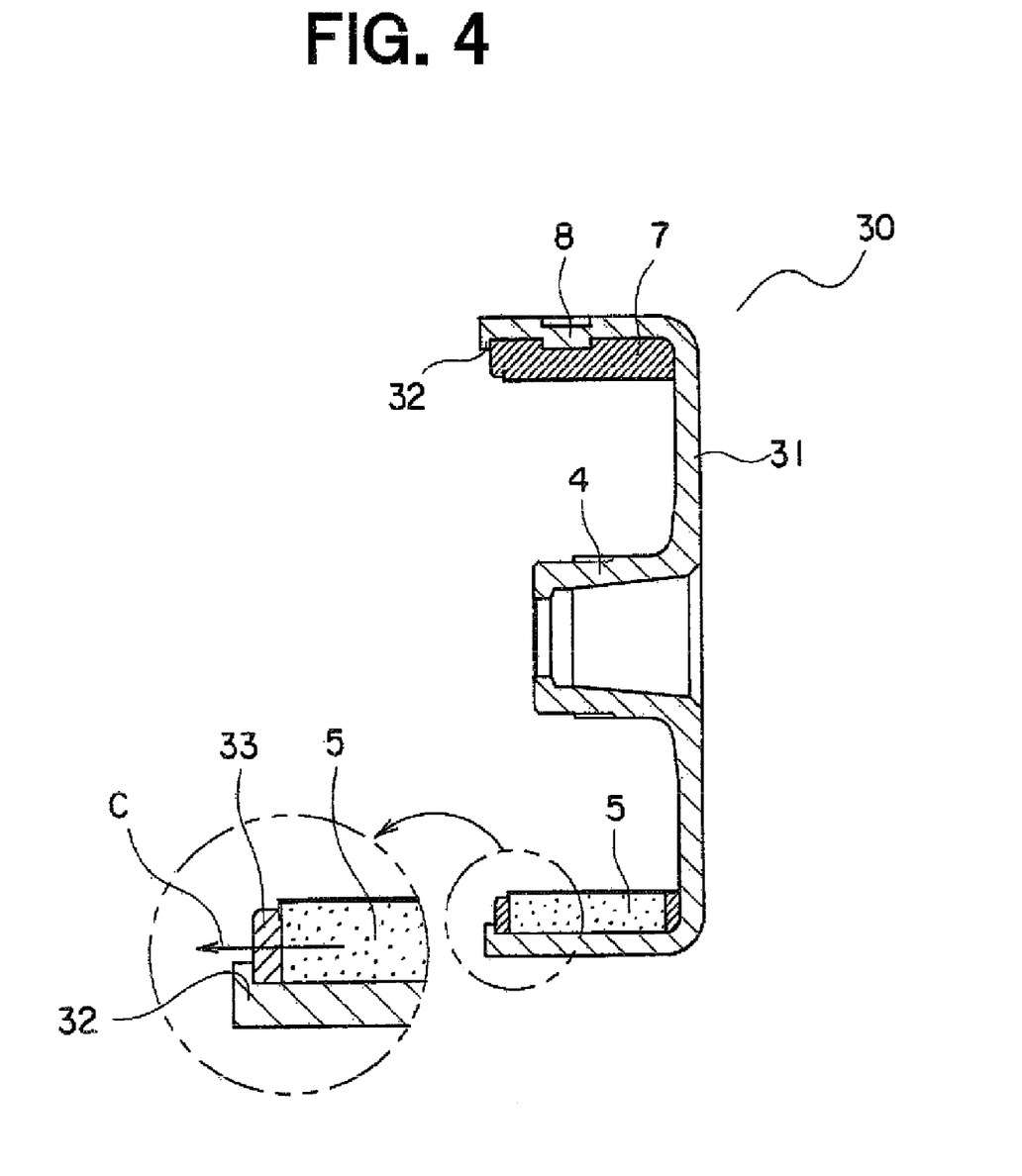
FIG. 4 is a cross sectional side view showing a rotor of a magneto generator according to a second embodiment of the present invention.

FIG. 4 is a cross sectional side elevational view that shows a rotor 30 of a magneto generator according to a second embodiment of the present invention.

In this second embodiment, a flywheel 31 has a collar portion 32 formed at an opening portion thereof so as to be bent over its entire perimeter along a circumferential direction at an inner diameter side.

A magnet positioning member 7 has a magnet coming-off preventing member 33 formed integrally therewith at the opening side of the flywheel 31 so as to be interposed between the collar portion 32 and the end faces of permanent magnets 5.

The other construction of this second embodiment is similar to that of the first embodiment.

In this embodiment, too, when a force in an axial direction (in a direction of arrow C in FIG. 4) acts on the permanent magnets 5, the force is mainly supported by a shearing stress generated in the collar portion 32, so the proof strength of the permanent magnets 5 resistant to the axial movement thereof can be improved to a great extent with a simple construction and at a low cost.

Here, note that the flywheel 31 is made of a ferrous material, and hence, in case where the magnets 5 are directly fixed for prevention of coming off by means of the collar portion 32, a magnetic force from the magnets 5 leaks to the collar portion 32, so the output of power generation is reduced. However, because of the interposition of the magnet coming-off preventing member 33 made of a non-magnetic resin between the collar portion 32 and the end faces of the permanent magnets 5, a magnetic gap can be ensured between the magnets 5 and the collar portion 32, thus making it possible to prevent the reduction of the output of power generation due to the leakage of the magnetic force.

Embodiment 3

Figure 5:
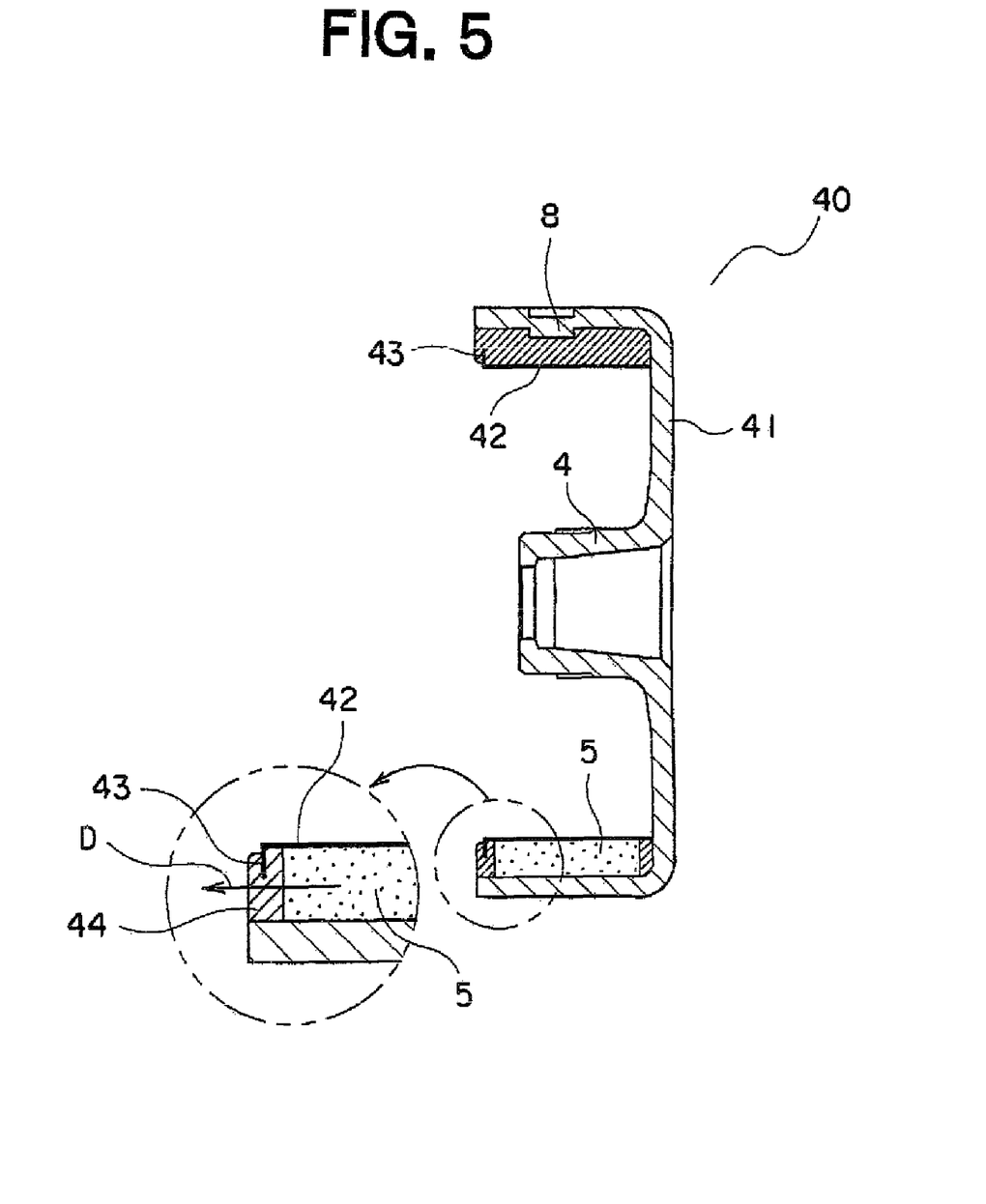
FIG. 5 is a cross sectional side view showing a rotor of a magneto generator according to a third embodiment of the present invention.

FIG. 5 is a cross sectional side elevational view that shows a rotor 40 of a magneto generator according to a third embodiment of the present invention.

In this third embodiment, a cover protector 42 has a collar portion 43 formed on a peripheral end thereof at a side near an opening portion of a flywheel 41 so as to be bent toward a radially outer side and extend over its entire perimeter along a circumferential direction.

A magnet positioning member 7 has a magnet coming-off preventing member 44 formed integrally therewith at the opening side of the flywheel 41 so as to cover the end faces of permanent magnets 5. The collar portion 43 is embedded in the magnet coming-off preventing member 44.

The other construction of this third embodiment is similar to that of the first embodiment.

Here, note that the collar portion 43 may be intermittently or discontinuously formed in a circumferential direction.

In this third embodiment, too, when a force in an axial direction (in a direction of arrow D in FIG. 5) acts on the permanent magnets 5, the force is mainly supported by the collar portion 43, so the proof strength of the permanent magnets 5 resistant to the axial movement thereof can be improved to a great extent with a simple construction and at a low cost.

In addition, the collar portion 43 is provided on a peripheral end of the cover protector 42, so the strength of the cylindrical-shaped cover protector 42 can be increased.

While the invention has been described in terms of preferred embodiments, those skilled in the art will recognize that the invention can be practiced with modifications within the spirit and scope of the appended claims.

What is claimed is:

1. A magneto generator comprising:
   a flywheel that has a circumference and rotates about an axis of rotation;
   a plurality of permanent magnets that are fixedly secured to an inner peripheral wall surface of said flywheel;
   a magnet positioning member made of a resin that is arranged at an inner side of said flywheel to position and fixedly secure said permanent magnets to said flywheel integrally therewith;
   a stator core that is arranged at an inner side of said permanent magnets and has a plurality of teeth protruding to a radially outer side; and
   magneto coils that are each formed of a conductor wound around said individual teeth;
   wherein said flywheel has a groove formed on its inner peripheral wall surface at an opening side thereof; and
   said magnet positioning member has a magnet coming-off preventing member formed at an opening side of said flywheel so as to cover end faces of said permanent magnets, and said magnet coming-off preventing member has a radially outwardly extending protrusion formed so as to be in axial engagement with said groove of said flywheel to prevent axial movement of said permanent magnets;
   wherein an inner wall surface of the magnet coming-off preventing member is formed radially outwardly compared to an inner wall surface of the permanent magnets, and
   wherein said protrusion engaging the groove is wedge-shaped.

2. The magneto generator as set forth in claim 1, wherein said magnet positioning member and said magnet coming-off preventing member are formed integral with each other.

3. The magneto generator as set forth in claim 1, wherein said magnet coming-off preventing member includes an outer surface that is approximately aligned with an outer radial extent of said permanent magnets, said protrusion extends radially outwardly from the outer surface, and said protrusion is provided between opposing surfaces of said groove.

4. The magneto generator as set forth in claim 1, further comprising a cylindrical cover protector made of non-magnetic metal and arranged in intimate contact with an inner side of each of the permanent magnets,
   wherein said protrusion of said magnet coming-off preventing member extends over an entire perimeter of the magnet coming-off preventing member along a circumferential direction, and
   said magnet coming-off preventing member covers the opening side end faces of the permanent magnets in an axial direction at the opening side of the flywheel.

5. A magneto generator comprising:

a flywheel that has a circumference and rotates about an axis of rotation;

a plurality of permanent magnets that are fixedly secured to an inner peripheral wall surface of said flywheel;

a magnet positioning member made of a resin that is arranged at an inner side of said flywheel to position and fixedly secure said permanent magnets to said flywheel integrally therewith;

a stator core that is arranged at an inner side of said permanent magnets and has a plurality of teeth protruding to a radially outer side; and magneto coils that are each formed of a conductor wound around said individual teeth;

wherein said flywheel has a radially inwardly extending protrusion formed on its inner peripheral wall surface at an opening side thereof; and said magnet positioning member has a magnet coming-off preventing member formed at an opening side of said flywheel so as to cover end faces of said permanent magnets, and said magnet coming-off preventing member has a groove formed so as to be in axial engagement with said protrusion of said flywheel to prevent axial movement of said permanent magnets, wherein said protrusion engaging the groove is convex-shaped.

6. The magneto generator as set forth in claim 5, wherein said magnet positioning member and said magnet coming-off preventing member are formed integral with each other.

7. The magneto generator as set forth in claim 5, wherein said magnet coming-off preventing member includes an outer surface that is approximately aligned with an outer radial extent of said permanent magnets, said groove extends radially inwardly from the outer surface, and said protrusion is provided between opposing surfaces of said groove.

8. The magneto generator as set forth in claim 5, wherein said groove of said magnet coming-off preventing member extends over an entire perimeter of the magnet coming-off preventing member along a circumferential direction, and said magnet coming-off preventing member covers the opening side end faces of the permanent magnets in an axial direction at the opening side of the flywheel.

\* \* \* \* \*